Feb. 18, 1947.    W. H. FARR ET AL    2,415,942
ELECTRIC FENCE CHARGING APPARATUS
Filed Aug. 5, 1943
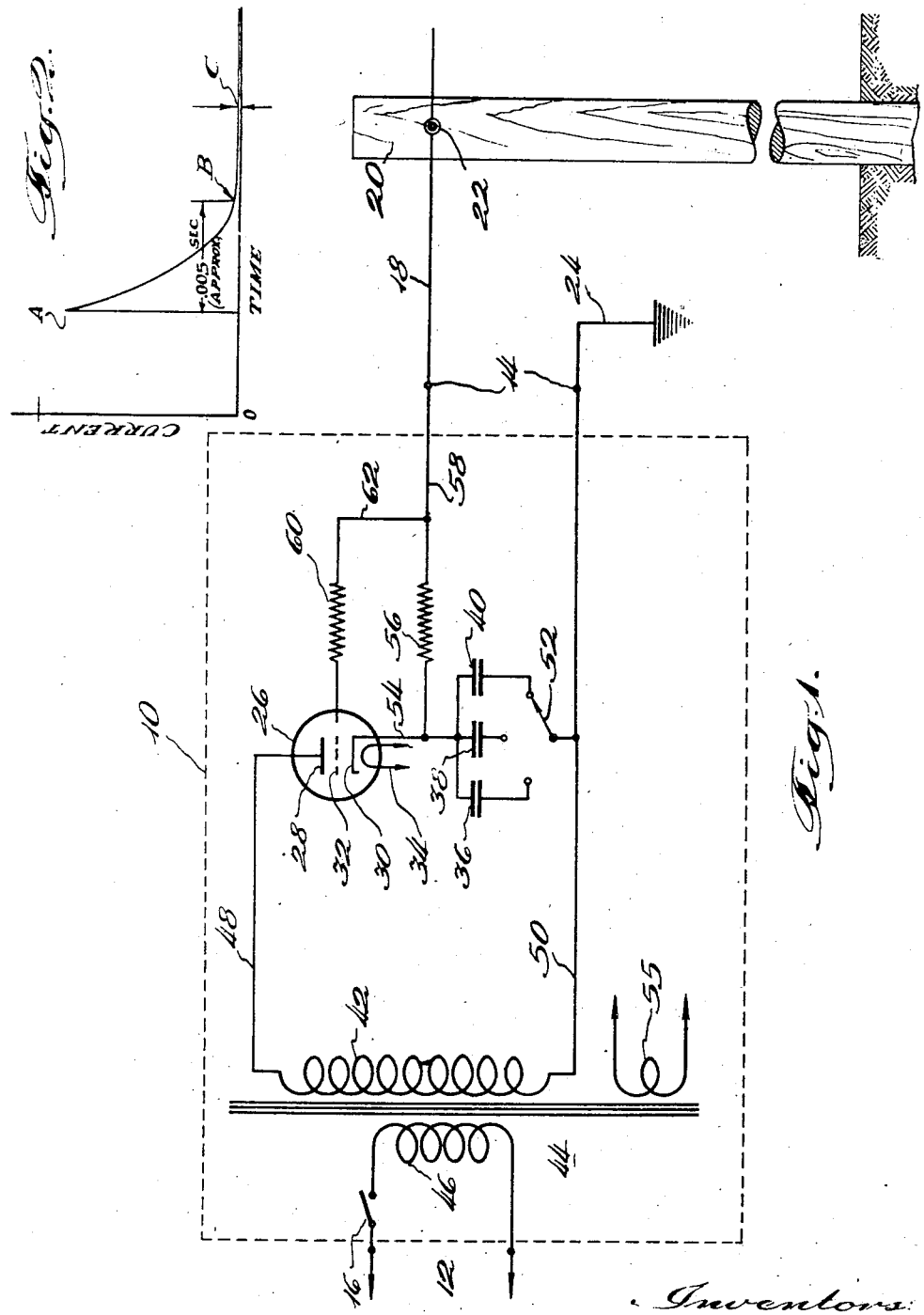
Inventors:
Willard H. Farr
William G. Fagen
By Williams, Bradbury & Huckle Attorneys Patented Feb. 18, 1947

2,415,942

UNITED STATES PATENT OFFICE 2,415,942

ELECTRIC FENCE CHARGING APPARATUS

Willard H. Farr and William F. Fagen, Chicago, Ill., assignors to Stewart-Warner Corporation, Chicago, Ill., a corporation of Virginia Application August 5, 1943, Serial No. 497,514

6 Claims. (Cl. 256—10)

The present invention relates to electric fences, and more particularly to an automatically operating electronic fence energizer or charger.

An object of the present invention is to provide an electric fence charging apparatus producing but a single discharge or impulse of short duration when the body of an animal contacts the fence. An advantage of the device of the present invention is that it enables the animal to clear itself from the fence without being subjected to a continued inhumane application of electric shocks irrespective of whether or not the animal is entangled with the fence.

A further object of the present invention is to provide an electric fence charging apparatus that produces not only a single impulse upon contact between the body of an animal and the fence, but also a sharp impulse.

A further object of the present invention is to provide a new and improved electric fence charging apparatus having no moving parts, such as relays or the like, and which may be made inexpensively.

A further object of the present invention is to provide an electric fence charging apparatus of the type including a condenser which is normally charged to a relatively high voltage and which is discharged upon contact between the body of an animal and the fence, and wherein the condenser and the other equipment necessary to charge the condenser are of small capacity.

A further object of the present invention is to provide a new and improved electric fence charging apparatus of a type including a condenser, wherein the condenser is normally charged to a relatively high voltage and is discharged substantially instantaneously upon contact between the body of an animal and the fence, and wherein the condenser charging rate is thereupon reduced so as to prevent any substantial charging of the condenser and to reduce the voltage applied to and the current passing through the fence as long as the contact continues.

Other objects and advantages of the present invention will become apparent from the ensuing description of one embodiment thereof, in the course of which reference is had to the accompanying drawing, in which Fig. 1 is a diagrammatic representation of one embodiment of the invention; and Fig. 2 is a graph illustrative of the shocking impulse occurring when the fence is contacted by an animal.

The fence charging apparatus of the present invention is indicated generally by the reference character 10. It has a pair of input terminals 12 and a pair of output terminals 14. Inasmuch as it is preferred that the apparatus be energized from an alternating current source, such, for instance, as the usual 110 volt alternating current supply line, the input terminals 12 may be connected to a suitable source of such voltage (not shown). An on-off switch 16 may be provided to control the supply of energy to the apparatus. The output terminals 14 are connected to the fence which, in the illustrated embodiment, comprises a bare conductive wire 18 and a series of fence posts 20 having insulators 22 supporting the wire. It should be understood that there are a number of fence posts, although but one has been shown. These fence posts are placed in the earth in conventional manner. The second output terminal 14 is connected to earth through conductor 24. It should be understood, however, that in some installations it is preferable to use two fence wires, one of which corresponds to the single wire 18 illustrated and the other to the earth connection. It should be understood also that the term "fence" is not limited to fences for pastures or other enclosures for cows, horses or other like animals, but is intended to be broad enough to include protective safeguards for houses, rooms and the like to prevent, or tend to prevent, human beings (a form of animal) from leaving or entering the premises.

The fence charger 10 is of the electronic type, preferably comprising a high vacuum triode 26 (of the 7193 type) having an anode 28, a cathode 30, a control grid 32, and a cathode heater 34. The tube is used essentially as a rectifier to charge a selected one of condensers 36, 38 and 40 (which may have values of .01, .03 and .06 mf.) utilized to provide the energy impulse or "shock" upon contact between an animal and the wire.

Under normal conditions, that is, when no animal is in contact with the fence, the selected condenser is charged to a relatively high voltage, as, for instance, about 1800 volts, which is the maximum voltage appearing across the secondary winding 42 of a transformer 44 having its primary winding 46 connected to the input terminals 12 through the previously referred to switch 16. One terminal of the secondary winding is connected to the anode 28 of the tube 26 through a conductor 48 and the other terminal of the winding is connected to the cathode 30 of the tube through the selected condenser. This connection is made through a conductor 50, a selector switch 52, and a conductor 54. The transformer has a second secondary winding 55 for supplying current to the cathode heater 34.

The apparatus of the present invention is so constructed and arranged that the condenser is discharged through the body of an animal in contact with the fence but once to produce but a single impulse energy discharge upon any such contact. This is accomplished preferably by controlling the conductivity of the tube 26 in response to the grounding of the fence wire through the body of the animal. The condensers are connected to the fence through the conductor 54 connected to the junction of the condensers and cathode of the tube, a current limiting and grid bias control resistor 56, and a conductor 58 leading to one of the terminals 14. The conductivity of the tube, and therefore the charging rate of the condenser, are reduced upon contact between the body of an animal and the wire 18 by a grid connection including a resistor 60 and a conductor 62 connecting the grid to the fence. The reduction in conductivity of the tube also increases the resistance of the tube with the result that the voltage applied to the fence is reduced.

The resistors 56 and 60 are so proportioned relative to the leakage resistance of the fence wire to ground that under normal conditions the tube is sufficiently conductive to charge the selected condenser to the maximum voltage occurring across the secondary winding 42 in a relatively short time (they may have values of about 100,000 ohms each). Under these conditions the grid is relatively less negative because the selected condenser discharges at but a low rate determined by the value of resistor 56 and the high leakage resistance to ground, so that there is little current flow through the resistor 56, conductor 58 and fence wire 18. However, when the leakage resistance to ground is reduced as upon contact therebetween and the body of an animal, the condenser discharges substantially instantaneously through the body of the animal, the discharge circuit including resistor 56, wire 18, and earth. The grid is thereby rendered more negative because of the increased voltage drop across resistor 56. Resistors 56 and 60 are also so proportioned that, as long as an animal remains in contact with the fence, the grid voltage is sufficiently negative to reduce the conductivity of the tube 26 to a value maintaining the condenser substantially discharged and decreasing the current flow through the fence to a substantially imperceptible value. While it is true that when an animal is in contact with the fence the condenser is charged slightly, the charging rate is reduced to such an extent that the condenser is not charged to any substantial amount by utilizing resistors 56 and 60 of relatively high value.

The nature of the current impulse applied to the fence upon contact therewith by an animal is illustrated in Fig. 2, to which reference is now had. The graph shows the variation in current with time when the fence is contacted by an animal. Under normal conditions, i. e., when the fence is clear, there is substantially no current flowing through the fence. The only current that flows at this time is the normal charging current dependent upon the leakage resistance of the fence to ground. For all intents and purposes this may be considered to be substantially zero. When the animal contacts the fence the charged condenser discharges through the fence and the current rises to a peak value indicated by the reference character A. This value may be in the neighborhood of about 500 milliamperes. Thereafter the current quickly decreases to a substantially imperceptible value of a few milliamperes. The final value of the current may be a few milliamperes, i. e., three, for instance, as indicated at the reference character C. The current reaches nearly this low value in about $5/1000$ of a second, as indicated by the reference character B. Thus, the animal coming into contact with the fence is provided with a single shocking impulse of relatively short duration, after which the current decreases to a safe and substantially imperceptible value of not more than about three milliamperes so that the animal may free itself readily. After the animal frees itself the current drops back to substantially zero and the condenser is charged ready for the next operation.

The intensity of the shock may be varied by selection of any one of the plurality of condensers 36, 38 and 40. The larger condensers provide the greater shock.

The apparatus of the present invention has a number of advantages. In the first place, it should be noted that whenever an animal comes in contact with the fence there is provided in a positive manner but a single high voltage impulse or discharge of the condenser after which the voltage applied to and the current passing through the fence is reduced, so that the animal can clear itself without difficulty. Furthermore, after the animal clears itself the apparatus returns to its initial condition, whereupon the condenser is automatically recharged to give a further shock whenever an animal again comes into contact with the fence. The impulse or discharge is sharp because the discharge circuit includes resistance only; i. e., it does not have in it any coils or other choke devices. The apparatus includes no moving parts whatever, and the fence is permanently connected to the condenser. As a result, the apparatus may be made inexpensively and a condenser of small size may be utilized since it is not necessary to operate any relays or the like.

While but a single embodiment of the invention has been illustrated, it should be understood that the present invention may be embodied in other forms. For instance, the apparatus could be used to advantage with a direct current voltage source, in which event the transformer could be eliminated. Other modifications will undoubtedly suggest themselves to those skilled in the art.

Having thus described our invention, what we claim as new and desire to secure by Letters Patent of the United States is:

1. An apparatus for energizing a fence comprising a conductive wire adapted to be placed in circuit with the body of an animal contacting the wire and of the type including a voltage source and a condenser, including in combination, a variable conductivity electron tube connecting said condenser to said voltage source, and means for connecting said condenser and tube to the wire, said last mentioned means including means operable in response to current flow in the fence circuit and controlling the conductivity of the tube so that the condenser is normally charged and is discharged to provide a current impulse through the body of an animal contacting the fence, after which the condenser remains substantially discharged and but little current flows through the body of the animal as long as the contact continues.

2. An apparatus for energizing a fence comprising a conductive wire adapted to be placed in circuit with the body of an animal contacting the wire and of the type including a voltage source, a condenser, including in combination a grid controlled electron tube connecting said condenser to said voltage source, and means connecting said condenser and tube to said wire, said last mentioned means including resistance means connected in series with the wire and to the grid of the tube and controlling the grid potential of the tube normally to maintain the tube conductive so that the condenser is charged substantially to the voltage of said source when little or no current flows through the resistance means and is discharged through the body of an animal contacting the fence, whereupon the flow of current through the resistance means increases to decrease the conductivity of the tube and the current flow through the fence is decreased to a low value and the condenser remains substantially discharged as long as the contact continues.

3. An apparatus for energizing a fence comprising a conductive wire adapted to be placed in circuit with the body of an animal contacting the wire and of the type including a voltage source and a condenser connected to the wire, including in combination means including a resistor connecting the condenser to said wire, and means including a variable conductivity electron tube between the condenser and through which the condenser is adapted to be charged and the voltage source and tube conductivity varying means coupled to the tube and the fence circuit and controlled in response to the flow of energy through said resistor for decreasing the current flow through said tube from the source to the condenser and wire to a substantially imperceptible value when an animal contacts the fence.

4. Apparatus for energizing a fence comprising a conductive wire adapted to be placed in circuit with the body of an animal contacting the wire, including in combination, a voltage source, an electron tube having an anode, cathode and control grid, a condenser, means connecting said anode to one terminal of said voltage source, means connecting said condenser across said cathode and the other terminal of said voltage source, means including a resistor connecting the junction of said cathode and said condenser to the wire, and means including a second resistor connecting the wire to said control electrode, said resistors being so proportioned relative to the leakage resistance of the wire that when the wire is uncontacted said condenser is charged through said tube substantially to the voltage of said source, and when the wire is contacted by an animal the condenser is discharged through said first resistor, the wire and the body of the animal, and the conductivity of the tube is reduced to decrease the current flow through the fence to a substantially imperceptible value as long as the contact persists.

5. An apparatus for energizing a fence comprising a conductive wire adapted to be placed in circuit with the body of an animal contacting the wire and of the type including a voltage source, an electron tube having an anode, cathode, and control grid, a condenser, and means connecting the anode to one terminal of the voltage source and connecting the condenser across the cathode and other terminal of the voltage source, including in combination, means including a resistor connecting the junction of the cathode and condenser to the conductive wire, and means including a second resistor connecting the conductive wire to said control electrode, said resistors being so proportioned relative to the leakage resistance of the wire that when little or no current flows through the wire the condenser is charged through said tube substantially to the voltage of the source, and when the wire is contacted by an animal the condenser is discharged through said first mentioned resistor, the wire and the body of the animal, and the conductivity of the tube is thereby reduced to decrease the current flow through the fence as long as the contact persists.

6. An apparatus for energizing a fence comprising conductive wire adapted to be placed in circuit with the body of an animal contacting the wire and of the type including a voltage source and a condenser, including in combination, variable resistance means connecting said condenser to the voltage source whereby said condenser is adapted to be charged from said voltage source, and means connecting said condenser and variable resistance means to the wire and controlling the value of said resistance means, said last mentioned means including current flow responsive means in the fence circuit operatively coupled to and controlling the resistance of said variable resistance means so that the resistance is low and the condenser charged substantially to the voltage of said source when there is little or no current flow in the fence circuit, as when no animal is in engagement with the fence wire, and the resistance is increased and the condenser remains substantially uncharged and slight current flows through the fence circuit when and as long as an animal is in engagement with the fence circuit.

WILLARD H. FARR.
WILLIAM F. FAGEN.

REFERENCES CITED

The following references are of record in the file of this patent:

UNITED STATES PATENTS

| Number | Name | Date |
| --- | --- | --- |
| 2,318,832 | Roach | May 11, 1943 |
| 2,333,224 | Agnew | Nov. 2, 1943 |
| 2,198,715 | Willis | Apr. 30, 1940 |
| 2,294,343 | Nunn | Aug. 25, 1942 |
| 2,007,383 | Opp | July 9, 1935 |
| 2,108,637 | Bartgis | Feb. 15, 1938 |

OTHER REFERENCES

Agricultural Engineering Nov. 1941, pgs. 400 to 404.